US005626325A

United States Patent [19]

Buchanan et al.

[11] Patent Number: 5,626,325

[45] Date of Patent: May 6, 1997

[54] HIGH PRESSURE CONTROL VALVE FOR A FUEL INJECTION SYSTEM

[75] Inventors: David L. Buchanan, Westport; Donald J. Benson, Columbus, both of Ind.

[73] Assignee: Cummins Engine Company, Inc., Columbus, Ind.

[21] Appl. No.: 528,303

[22] Filed: Sep. 14, 1995

[51] Int. Cl.[6] .................................................. F16K 31/02

[52] U.S. Cl. .................................. 251/129.14; 137/539.5

[58] Field of Search ................................ 137/514, 539.5; 251/64, 129.14

[56] References Cited

U.S. PATENT DOCUMENTS

| | | | |
|---|---|---|---|
| 3,738,578 | 6/1973 | Farrell . | |
| 3,861,643 | 1/1975 | Moffatt | 251/129.14 |
| 3,887,162 | 6/1975 | Antoni et al. | 251/129.14 |
| 4,356,980 | 11/1982 | Krauss | 251/129.14 |
| 4,742,964 | 5/1988 | Ito et al. . | |
| 4,946,107 | 8/1990 | Hunt . | |
| 4,982,902 | 1/1991 | Knapp et al. . | |
| 5,222,673 | 6/1993 | Reiter . | |
| 5,255,855 | 10/1993 | Maier et al. . | |
| 5,322,260 | 6/1994 | Forbes et al. | 251/129.14 |

*Primary Examiner*—Thomas N. Moulis

*Attorney, Agent, or Firm*—Sixbey, Friedman, Leedom & Ferguson, P.C.; Charles M. Leedom, Jr.; Donald R. Studebaker

[57] ABSTRACT

A high pressure control valve according to the present invention provides effective and predictable control of a timing fluid and injection fuel metering system of an internal combustion engine. The control valve includes an armature that abuts against a majority of the surface of a valve element to help minimize beating problems. In addition, a compliant web means provides a flexing motion when the valve element seats with a valve seat to mitigate problems of seat beating. Furthermore, the present invention reduces the number of parts of the control valve to achieve simplicity in structure and lower costs, including eliminating the need for a valve stop pin.

25 Claims, 6 Drawing Sheets

HIGH PRESSURE CONTROL VALVE FOR A FUEL INJECTION SYSTEM

TECHNICAL FIELD OF THE INVENTION

This invention relates to control valves used in timing and metering circuits for a timing fluid and injection fuel metering system of an internal combustion engine, and more particularly to a control valve having improved actuator structure and control valve housing structure to minimize the number of parts of the control valve and also to minimize the negative effect of beating on the armature and valve seat which shorten the life of the valve.

BACKGROUND OF THE INVENTION

Electromagnetically actuated control valves are widely used in fuel injectors (see U.S. Pat. No. 4,742,964 to Ito et al.), and are also widely utilized in timing fluid and injection fuel metering systems for precisely controlling injection fuel and timing fluid on a pressure-time (P-T) basis as disclosed in U.S. application, Ser. No. 08/208,365 commonly assigned to assignee of the present invention. Precise control of the timing and metering of fuel is necessary to achieve maximum efficiency of the fuel injection system of an internal combustion engine. Accordingly, there exists a need for a simple, low cost control valve that provides the precise control required in the injection fuel metering systems.

These control valves are normally operated by an electronic driver circuit that turns on a high current for a short period of time, and then drops to a lower current for the remainder of the time that the driver circuit is turned on. The flow delivered to the fuel injectors, via the control valves, is a function of the time that the actuator of the control valve is turned on and the pressure drop across the valve.

U.S. Pat. No. 4,982,902 to Knapp et al. discloses an electromagnetically actuatable valve including an actuator portion having an armature with extending tongues which firmly connect a ball with the armature. In addition, a closing spring sits on a side of the ball opposite to a valve seat and biases the ball against the valve seat so as to close the valve seat in the non-excited state of the actuatable valve. The armature, however, is of a thin disc-like form and upon actuation of solenoid coils, rapid movement may result in fluttering movement of the flat armature. This may result in improper seating of the ball on the valve seat, and therefore poor precision in controlling the amount of fuel to be passed to the fuel injectors.

In addition, even though the disclosed armature in Knapp et al. executes a pivotal motion to assure seating of the ball in the valve seat, this pivoting does not ensure a proper seating at precisely the intended point of time and further permits the ball to unintentionally move in a lateral fashion which reduces the likelihood of a clean seating with the valve seat. In addition, the armature has limited contact area with the ball through the tongue portions of the armature. When the valve is excited, the armature rapidly moves to a position in contact with a step portion of the control valve housing that limits movement of the armature. The armature itself, made of sheet metal, is soft and the contact force with the step portion can damage the armature. In addition, when the valve is to be placed in its unexcited (closed) state, the ball rapidly moves to its initial position to seat with the valve seat to dose off fluid flow. The impact force exerted on the ball results in impact force on the armature. The mount of beating on the armature is a function of the contact area with the ball and the force applied. The armature is made of magnetic material and is normally very soft. With little contact area between the tongues of the armature and the ball, a given amount of force will result in high beating, which the soft armature is not able to withstand for an extended period of time. Furthermore, the disclosed system of Knapp et al. is unlikely to be useful in systems that demand that the control valve be used in high pressure circuits because the reference discloses that it is intended for use in low pressure environments.

A further problem existing in Knapp et al., and present control valves generally, is the seat beating that occurs when the control valve is rapidly moved between its open and closed positions. Even though the valve seat is made of a much harder material than the armature, the rapid closing motion of the armature forces the ball to harshly seat against the valve seat, imparting great impact force between the ball and the valve seat, causing both spalling of the ball and seat beating to the valve seat. Both of these problems further reduce the life of the parts of the control valve, and therefore the life of the control valve itself.

U.S. Pat. No. 3,738,578 to Farrell discloses a magnetic armature valve wherein a permanent magnetic armature has a ball welded to the end of the armature. Therein, the ball seats against a conical seat with the aid of a biasing spring acting against the armature. The force that the spring imparts on the armature is adjustable with the movement of a screw in a nut. The reference also discloses that the nut, which is used to limit the travel of the armature, can be adjusted so as to adjust the total travel of the armature. Problems, however, exist with this valve assembly as well. For one, welding the check ball results in deformation of the ball from its purely spherical form, which results in a imprecise seating of the check ball with the conical seat. This improper seating results in poor control over the amount of fuel flowing through the control valve to the assembly to the cylinders of the engine.

In addition, just as with Knapp et al., the conical seat and the check ball must withstand great stress with the high pressure, rapid movement of the check ball against the conical seat to control fuel flow to the cylinders of the engine. This results in rapid deterioration of the conical seat and the check ball due to seat beating and ball spalling, respectively. These problems further exacerbate the problems of improper seating and imprecise fuel flow to the cylinders in addition to limiting the life of the parts themselves.

U.S. Pat. No. 4,946,107 to Hunt discloses an electromagnetic fuel injection valve including a V-shaped notch formed at the exit end of a nozzle of a fuel injector wherein wings of the notch form guide tips. A ball valve, or check ball, is secured in the notch and seats against a cut-out portion of a nozzle seat. This structure, however, is susceptible to many of the problems of the assemblies of the above-noted patents. For instance, the notch portion does not maximize the contact area between the ball valve and the nozzle. Therefore, with a given amount of contact force between the end of the nozzle and the ball valve, force from the contact of the ball valve and the nozzle seat is imparted to the nozzle (made of a soft material) which causes beating of the nozzle and can easily damage the nozzle, thereby shortening the life of the injector.

Furthermore, because the notch portions do not to cross the major diameter of the ball valve, the ball valve must be welded to the notch portions. If this is the case, then the problem of ball deformation occurs, as discussed above. If an adhesive substance is used to secure the ball to the notch portions, this can alter the positioning of the ball valve so as to improperly seat in the nozzle seat even if a very thin layer of adhesive is used.

U.S. Pat. Nos. 5,222,673 to Reiter and 5,255,855 to Maier et al. both disclose fuel injection valves wherein the fuel injection valve includes an armature that biases a ball-shaped valve closing body toward a valve seat. When a magnetic coil is energized and the armature is moved to its excited position, the ball-shaped valve closing body comes into contact with a stop pin so as to limit the movement of the ball-shaped valve closing body.

Many of the previously-noted problems also exist with this structure. First, the armature contacts the ball-shaped valve body in a limited amount of area, which means that a great amount of force is placed on the armature because of the impact force experienced when the ball-shaped valve body contacts the valve seat. The soft armature experiences deformation quickly, shortening its useful life. In addition, when the ball-shaped valve body is lifted from the valve seat and its movement is limited by contact with the stop pin, a great amount of impact force generated by the contact of the stop pin and the ball-shaped valve body causes pin beating and ball spalling. Even though the underside of the stop pin, which is what the ball-shaped valve body contacts, is made of a hardened material in Reiter and Maier et al., this does not prevent pin beating, which leads to deformation or cracking of the stop pin. All of these problems result in improper fluid flow control and a shortened life of the fuel injector.

Therefore, there still exists a need for a simple, low cost control valve that minimizes the problems of armature deformation, pin beating, ball spalling, and seat beating without compromising the precise control necessary in a timing fluid and injection fuel metering system.

SUMMARY OF THE INVENTION

An object of the present invention is to overcome the above-noted problems with the prior art and to provide a control valve for a timing fluid and injection fuel metering system of an internal combustion engine that provides precise control using a simple, low cost construction.

It is another object of the present invention to provide a control valve for a timing and injection fuel metering system that provides precise control using a minimum number of parts.

It is yet another object of the present invention to provide a control valve for a timing fluid and injection fuel metering system of an internal combustion engine that eliminates the need for a stop pin.

It is yet a further object of the present invention to provide a control valve for use in timing and metering circuits of a timing fluid and injection fuel metering system that provides an accurate and predictable metering of fuel using a minimum number of parts.

It is yet a further object of the present invention to provide a control valve for an internal combustion engine that eliminates the effects of pin beating and minimizes the effects of ball spalling and seat beating.

It is yet another object of the present invention to provide a control valve for a timing fluid and injection fuel metering system that provides a compliant web to minimize the negative effect of impact force between a check ball and a valve seat in order to maximize the life of the valve.

It is yet a further object of the present invention to provide a control valve for a timing fluid and injection fuel metering system that eliminates the problem of pin beating by eliminating the need for a stop pin in the control valve for limiting the travel of an valve element.

It is yet another object of the present invention to provide a control valve for an internal combustion engine that maximizes the contact area between the armature and the check ball to minimize the likelihood of deformation of the armature and ball spatting due to impact forces and to minimize ball spalling.

In order to achieve the above-mentioned objects, and other objects that will become apparent from a description of the invention, a control valve for a timing fluid and injection fuel metering system is provided which minimizes the number of cooperating parts and provides the necessary precision for effectively and predictably controlling the fuel metering system. The control valve of the present invention includes an actuator means having an armature and a valve element supporting member connected thereto, with a valve element such as a check ball is secured to a recessed area of the valve element supporting member. The check ball is secured against the recessed area of the valve element supporting member in part by an annular extension of the supporting element that extends beyond the major diameter of the check ball and is crimped inward towards to the check ball to secure the ball in place.

In addition, the recessed area of the valve element supporting member has a semispherical shape so that the check ball fits against it in a ball and socket fashion. The shape of recessed area is such that more than half of the surface of the check ball is covered by the recessed area to provide a greater contact area between the check ball and the supporting element.

In addition, an armature shim is placed between the armature and an upper pole piece, and when solenoid coils in the control valve are energized, causing the armature to move the check ball away from a valve seat to open a passage in the control valve, the travel of the armature is limited by the upper pole piece hitting the armature shim.

Furthermore, a mounting flange for the control valve includes a compliant web means for alleviating valve seat beating. The compliant web means is thin and is designed to bend slightly when the check ball makes contact with the valve seat. This slight bending of the compliant web means provides a cushioning effect that minimizes the negative effects of seat beating that is due to impact forces when the check ball contacts the valve seat.

In an alternative embodiment for the control valve, instead of having an armature shim placed between the armature and the upper pole piece, the movement of the armature is restricted by a center valve pin against which a center portion of the U-shaped armature seats. In this embodiment, a biasing adjusting means is placed in an inner bore region formed in the control valve, and is used to adjust the bias force that a compression spring places on the check ball.

These, and other objects and advantages will become apparent from the following detailed description and accompanying drawings.

DETAILED DESCRIPTION OF THE PREFERRED EMBODIMENTS

Figure 1:
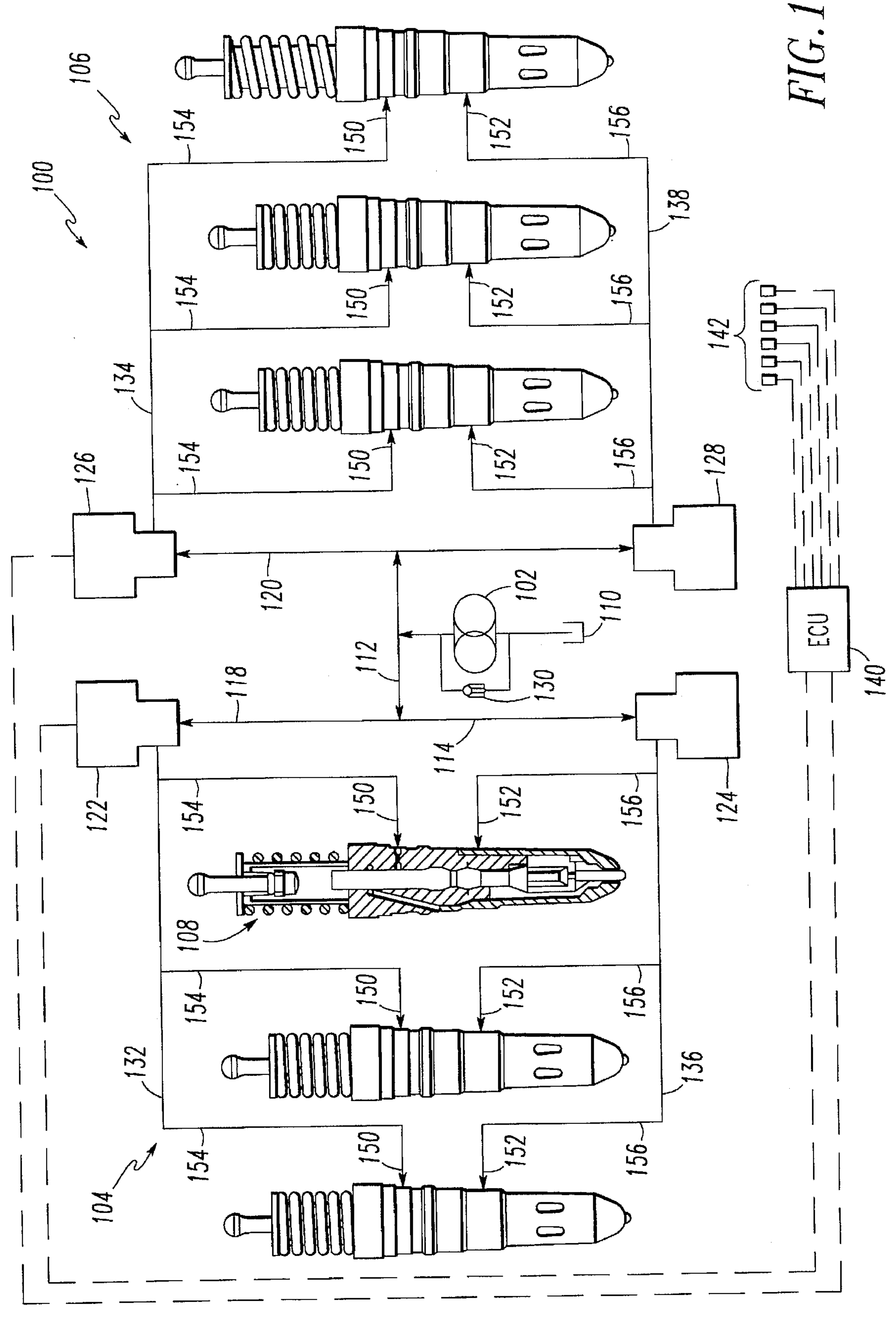
FIG. 1 is a schematic view of a timing fluid and injection fuel metering system for an internal combustion engine.

FIG. 1 illustrates generally a timing fluid and injection fuel metering system 100 for a six-cylinder internal combustion engine in which the control valve of the present invention may be utilized. This system is substantially similar to the Individual Timing and Injection Fuel Metering System disclosed in allowed U.S. application Ser. No. 08/208,365, filed Mar. 10, 1994, and assigned to the assignee of the present invention, the contents of which are incorporated herein by reference.

Generally, the metering system 100 comprises a fuel supply pump 102 for supplying low pressure fuel to both a first set of unit fuel injectors 104 and a second set of unit fuel injectors 106 via a timing fluid control valve 122 and an injection fuel control valve 124. Each fuel injector 108 of each set of injectors 104, 106 is operable to create a timing period and a metering period within which the control valves 122, 124, 126, 128 operate to define the amount of timing fluid and injection fuel, respectively, metered to the injector. By providing separate timing and metering circuits controlled individually by a respective control valve, the metering system can effectively and predictably control both fuel injection timing and metering at the same time during the metering stroke of an injector plunger, thereby maximizing the time period or window of opportunity available for metering of fuel and timing fluid. Moreover, the metering system maximizes the time period for metering for each injector of a particular set of injectors by selectively grouping the injectors with respect to the sequence of injection periods of the entire bank of injectors to allow the metering and timing periods of a specific group to be spread throughout the total cycle time of the engine.

Fuel supply pump 102 is a gear pump which draws fuel from a reservoir 110 and directs it to a common supply passage 112. Supply passage 112 supplies fuel to both a first fuel supply path 114 and a second fuel supply path 116 providing fuel for injection to the first and second set of injectors 104, 106 respectively. Supply passage 112 also supplies fuel to both a first timing fluid supply path 118 and a second timing fluid supply path 120 providing fuel, as timing fluid, to the first and second set of injectors 104, 106 respectively. A bypass valve 130 positioned in a bypass line of supply pump 102 maintains the fuel supply at a substantially constant pressure which is preferably between 100 and 500 psi. Bypass valve 130 is spring biased to open at a predetermined downstream fuel pressure to allow fuel from the outlet side of pump 102 to flow through the bypass line to the inlet side of pump 102 thereby maintaining the supply fuel pressure at the predetermined level.

The timing fluid control valves 122,126 and injection fuel control valves 124, 128 are positioned in the respective timing fluid supply paths 118,120 and fuel supply paths 114,116 to control the flow of timing fluid and injection fuel to the respective injectors. The control valves 122, 124, 126, 128 are each of the electromagnetic or solenoid-operated type valve assemblies having valve elements operable between open and closed positions to control the flow of timing fluid and fuel from the supply paths 114, 116, 118, 120 to the injectors. The control valves 122, 124, 126, 128 are controlled by an electronic control unit CECU) 140 which receives signals such as engine speed and position, accelerator pedal position, coolant temperature, manifold pressure and intake air temperature signals from corresponding engine sensors indicated generally at 142. On the basis of these signals, the ECU 140 judges the engine operating condition and emits control signals to the control valves 122, 124, 126, 128 such that the fuel injection timing and the amount of fuel to be injected through each injector 108 are optimized for the engine operating condition. The structure and operation of the control valves 122,124,126,128 will be described in greater detail below.

First timing fluid control valve 122 and second timing fluid control valve 126 deliver fuel into respective timing fluid common rail portions 132,134 of the respective first and second timing fluid supply paths 118,120. Likewise, first and second injection fuel control valves 124,128 control the flow of fuel to respective first and second injection fuel common rail portions 136,138 of the respective first and second fuel supply paths 114,116. Each injector 108 includes a timing circuit 150 for receiving timing fluid from timing fluid common rail 132,134 and a metering circuit 152 for directing fuel from common rail portions 136,138 into the injector for subsequent injection into the corresponding cylinder of the engine. Timing fluid is provided from timing fluid control valves 122,126 to individual fuel injectors 108 via branches 154 and fuel is provided from the injection fuel valves 124,128 to individual fuel injectors 108 via branches 156.

Figure 2:
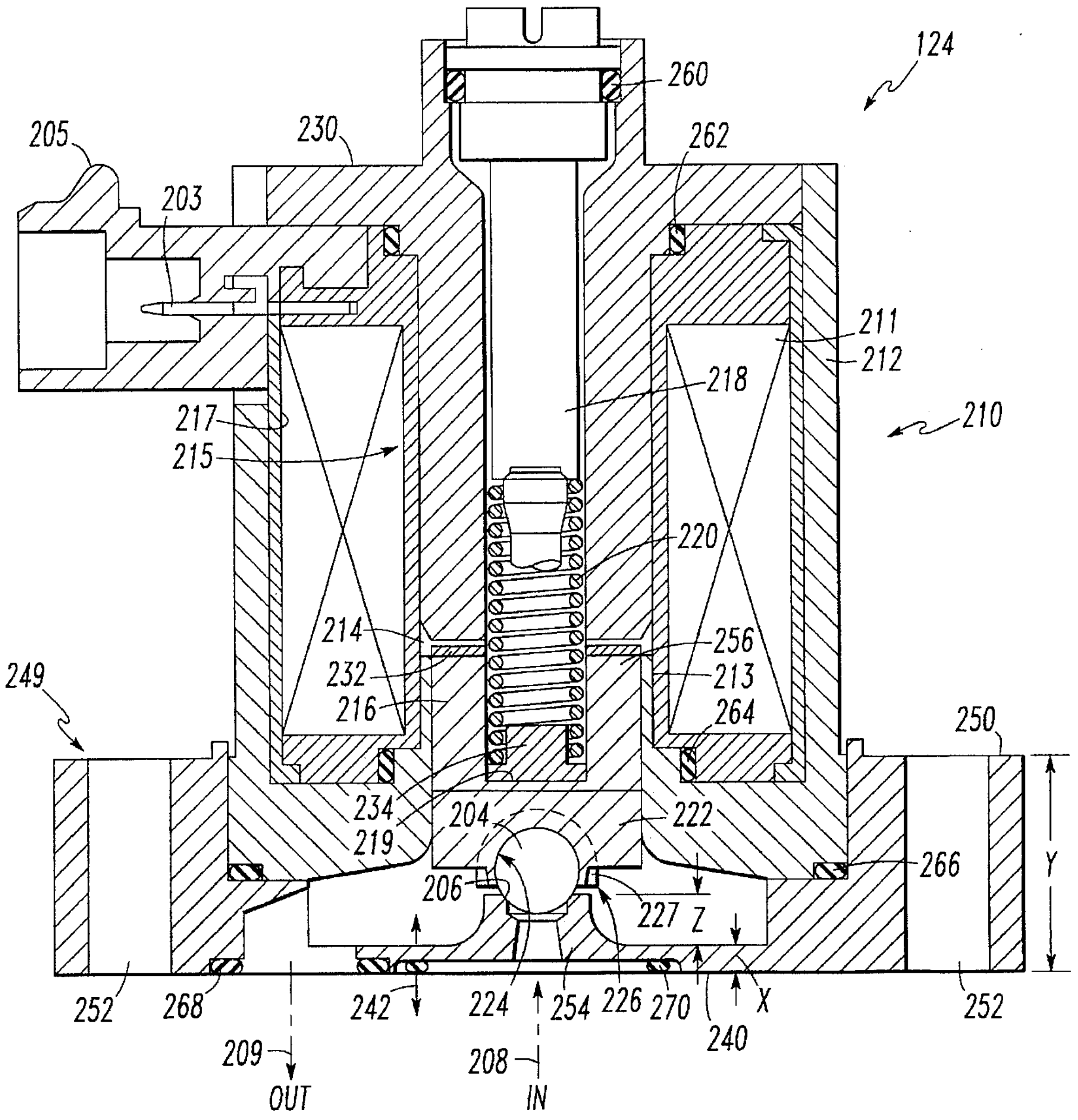
FIG. 2 is a cross-sectional view of a control valve in an unexcited (closed) state in accordance with a first embodiment of the present invention.

Referring now to FIG. 2, the control valve in accordance with a first embodiment of the present invention will be described in greater detail. FIG. 2 illustrates a cross-sectional view of an injection fuel control valve 124 [hereinafter the control valve 124] where the control valve is in an unexcited (closed) state. It should be noted that injection fuel control valve 128 will be the same as the control valve 124, and timing fluid control valves 122,126 will also be substantially the same except for the mounting means 249, which will be discussed below. In addition, it should be noted that while the mounting means 249 of the present invention includes a mounting flange 250 having mounting bores 252 for bolts or screws, any other structure that provides a fastening function may be used, such as other types of flanges, brackets, or support devices.

In this first embodiment, the control valve 124 comprises a housing 210 for the components of the control valve 124. A control signal 202 from ECM 140 (see FIG. 1) enters the control valve 124 through a terminal 203 that is mounted in a coil assembly 205. The ECM 140 regulates when the control valve 124 is placed into its open position permitting the flow of fluid between an inlet 208 and an outlet 209 of the valve. An actuation means, which is shown as a solenoid 211/armature 216 assembly in FIG. 2, carries the control valve 124 between its closed and open positions. It should be noted that other structures to actuate the control valve may be used, such as any other form of electromagnetic assembly or non-electromagnetic assemblies such as pneumatic, hydraulic, cam driven, or spring-based structures. In this case, a solenoid coil 211 is positioned between a bobbin 213 located on an inner side 215 of the solenoid coil 211 and the coil assembly 205 on the outer side 217. A coil housing 212 extends around part of the coil assembly 205 positioned on the outer side 217 of the solenoid coil 211, below the solenoid coil, and partly on the inner side 215 of the solenoid coil 211. In an inner bore region 214 formed within the axis of the control valve 124, a limiting means 230 shown as an upper pole piece is positioned below which an armature shim 232 is located, and below the armature shim 232 is positioned an armature 216. It should be noted that alternative structures than shown may be used for the limiting means 230 and armature shim 232, as long as they provide the necessary limiting functions that the upper pole piece 230 and armature shim 232 perform, which are described in detail below.

In addition, a compression spring 220 is positioned in the inner bore region 214 so as apply a force on a middle portion 219 of the U-shaped armature 216, which causes a valve element, such as a check ball 204, to contact valve seat 206. Fluid cannot enter the control valve 124, thereby cutting off fluid flow between the inlet 208 and outlet 209. The compression spring 220 is guided at its top end by a spring guide/spacer 218 and at its bottom end by a spring shim 234. Connected to the armature 216 is a valve element supporting member 222 to which the check ball 204 is secured. In FIG. 2, the valve element supporting member 222 is shown as integral with the armature 216 and of the same material as the armature 216, but the valve element supporting member 222 may be a separate component and of a separate material than the armature 216. That is, while the armature 216 may be a soft magnetic material, the valve element supporting member 222 may be made of a hard material, such as the material that the check ball 204 or valve seat 206 are made of.

An important aspect of the present invention is the manner of securing the check ball 204 to the valve element supporting member 222. The valve element supporting member 222 includes a recessed area 227 which includes a recessed portion 224, shown as a semispherical shape in FIG. 2. This semispherical shape has a spacial diameter just larger than the diameter of the check ball 204 so that the check ball 204 firmly abuts with the recessed portion 224 in a ball and socket manner. In addition, the recessed area 227 has an annular extension 226 that extends beyond the major diameter of the check ball 204 and crimps inward against the check ball 204 to keep the check ball 204 securely against the valve element supporting member 222.

It should be noted that the recessed area 227 is such that the valve element supporting member 222 surrounds more than half of the total surface area of the check ball 204. This provides maximum contact area between the check ball 204 and the valve element supporting member 222 (or simply the armature 216 if the valve element supporting member 222 is an integral component with the armature as shown in FIG. 2). The significance of this maximum contact area will be explained below.

It should also be noted that as shown in FIG. 2, one advantage of the present invention is that no gluing substances or welding are necessary to securely hold the check ball 204 in the recessed area 227. Avoiding the use of gluing substances eliminates the possibility of having the check ball 204 offset from the intended position due to the glue. Even a slight offset of the check ball 204 causes inaccurate seating with valve seat 206 when the check ball 204 moves between its closed position, as shown in FIG. 2, and its open position shown in FIG. 3 and discussed below. Accurate seating is essential for precisely controlling the amount of timing fluid or injection fuel—depending on which type of control valve is being referred to—flowing through the control valve to the necessary unit fuel injector 108 in the timing and metering system 100 shown in FIG. 1. In addition, securing the check ball 204 to the valve element supporting member 222 by welding may cause a slight deformation of the check ball, which may also result in improper seating in the valve seat and therefore, an imprecise amount of timing fluid or injection fuel being administered to the unit fuel injectors 108.

Another advantage of the present invention is that it eliminates the need for a valve stop pin that is commonly used in conventional control valves. Instead of using a valve stop pin to limit the motion of the check ball 204, the armature 216 is positioned such that it limits this motion. Therefore, without a valve stop pin, pin beating cannot occur, thereby increasing the useful life of the control valve 124. Furthermore, eliminating the conventional valve stop pin simplifies the control valve and saves component costs. When the armature 216 is utilized to limit the motion of the check ball 204, because the armature 216 is normally made of soft magnetic material and the check ball 204 is made of a much harder material, beating and deformation problems may occur due to an impact force created when the check ball 204 seats against the valve seat 206. To alleviate this problem, a greater contact area is used between the armature 216 and the check ball 204 than in conventional designs. As explained above, the recessed area 227 of the valve element supporting member 222 abuts with more than one half the total surface of the check ball 204. The problem of beating is a function of the contact area and the force applied. In this case, with a given impact force applied, providing a greater contact area results in less beating. Therefore, with the present arrangement, problems of armature beating and deformation are minimized due to the great mount of contact area between the valve element supporting member 222 and the check ball 204.

Figure 3:
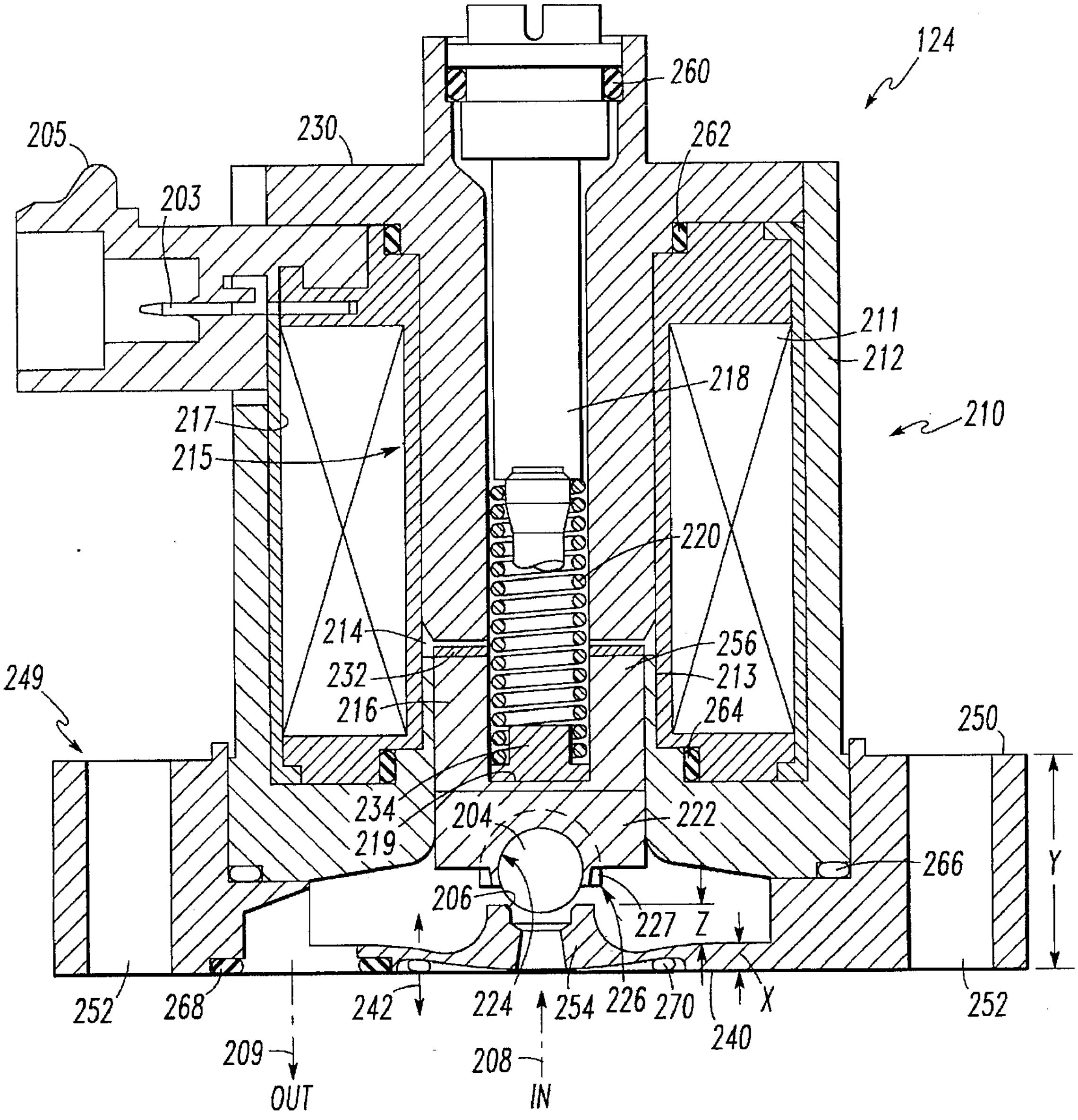
FIG. 3 is a cross-sectional view of the control valve in an excited (open) state in accordance with the first embodiment of the present invention.

Another important aspect of the present invention is a compliant web means 240, which in FIG. 2 is shown as integral with the mounting flange 250 and has an extended boss portion 254 in which the valve seat 206 is formed. The compliant web means 240 provides a flexing motion, shown generally with arrows 242, when the check ball 204 moves from an open position as shown in FIG. 3 to the closed position shown in FIG. 2 and contacts with the valve seat 206. The function of the compliant web means 240 will be discussed in more detail below.

Last, o-ring seals 260,262,264,266,268,270 provide necessary, effective sealing between the various components of the control valve 124, so that fluid does not unintentionally leak from different parts of the control valve 124.

FIG. 3 illustrates the control valve 124 in its fully energized (open) state according to the first embodiment of the present invention. The movement of the components when the control valve 124 is excited will now be described in detail. When the ECM 140 sends a signal to place the control valve 124 in its open position, signal 202 will induce a current in the solenoid coil 211. A magnetic field is created, causing the armature 216 to move upward (as shown in FIG. 3) in the inner bore region 214 towards the upper pole piece 230. The valve element supporting member 222 also moves upward, as does the check ball 204 that is secured against the recessed area 227 of the valve element supporting member 222. This movement lifts check ball 204 away from valve seat 206, thereby creating a fluidic connection between inlet 208 and outlet 209. The movement of the armature 216 is limited by the upper pole piece 230. The magnetic armature 216 and the upper pole piece 230, however, cannot come into contact with one another. Therefore, the donut-shaped, non-magnetic armature shim 232 is positioned between the outer portion 256 of the armature 216 and the upper pole piece 230 to avoid contact between the two components.

It should be noted that for illustration purposes, FIG. 3 shows an exaggerated version of the movement of armature 216/check ball 204 and an armature shim 232 with an exaggerated thickness. The actual movement of the check ball 204 will be on the order of few thousandths of an inch. The check ball 204 only moves slightly so that the amount of fluid passing through the control valve is precisely controlled, and a larger gap would be unnecessary. In addition, the actual thickness of the armature shim 232 used in this embodiment is also on the order of a few thousandths of an inch. The movement of the armature 216/check ball 204 and the thickness of the armature shim 232, however, may be adjusted as desired depending on the particular application.

When the ECM 140 determines that the fluidic connection between the inlet 208 and the outlet 209 must be cutoff and the control valve 124 must be placed back into its closed position, the appropriate control signal 202 is sent through the terminal pair 203 and the solenoid coils 211 are deenergized. This deenergization causes the armature 216/check ball 204 to travel back down the inner bore region 214 of the control valve 124 until the check ball 204 seats with the valve seat 206.

Focusing on the check ball 204 contacting the valve seat 206, the need for the compliant web means 240 becomes apparent. The movement of the armature 216/check ball 204 occurs at a very high rate and creates a great amount of impact force when the check ball 204 contacts the valve seat 206. In conventional arrangements, the rigid valve seat 206 must withstand the impact force by itself, which results in severe seat beating, especially because of the minimal contact area between the check ball 204 and the valve seat 206. In order to alleviate this problem, in the present control valve 124, when the check ball 204 contacts the valve seat 206, the compliant web means 240 flexes slightly, as shown by arrows 242, thereby reducing the impact force. In addition, this flexing is only temporary, and the compliant web means 240 immediately returns to its original shape once the impact force dissipates. The compliant web means 240 minimizes the amount of seat beating, thereby lengthening the useful life of the valve seat 206 and the control valve 124 overall.

In FIG. 3, the compliant web means 240 is shown as integral with the mounting flange 250 and has a thinner thickness x than the thickness y of a portion of the mounting flange 250 surrounding the mounting bores 252. In addition, the compliant web means 240 is shown having a boss portion 254 of thickness z extending outward from the compliant web means 240, wherein the valve seat 206 is formed in the boss portion 254. Despite the structure shown in FIG. 3, the following should be understood: (1) the mounting flange 250 may be a separate component and/or of a different material than the compliant web means 240, (2) the compliant web means 240 need not have an extended boss portion 254 in which the valve seat 206 is formed, and (3) the compliant web means 240 need not have the exact thickness shown relative to the thickness of the other components as depicted in FIG. 3. Furthermore, the compliant web means 240 may be shaped in any manner as long as it still performs the necessary flexing motion.

It should be noted that the movement of the armature 216/check ball 204 between open and closed positions is extremely rapid, occurring many times per second. Furthermore, fluid flows through the control valve 124 at a very high rate, so that the control valve 124 must work accurately under very high pressures. Therefore, these components must be precisely built in order to achieve the necessary accuracy. The above-mentioned components of the present invention provide a control valve that works efficiently with the necessary precision and has a longer useful life than conventional control valves.

Figure 4:
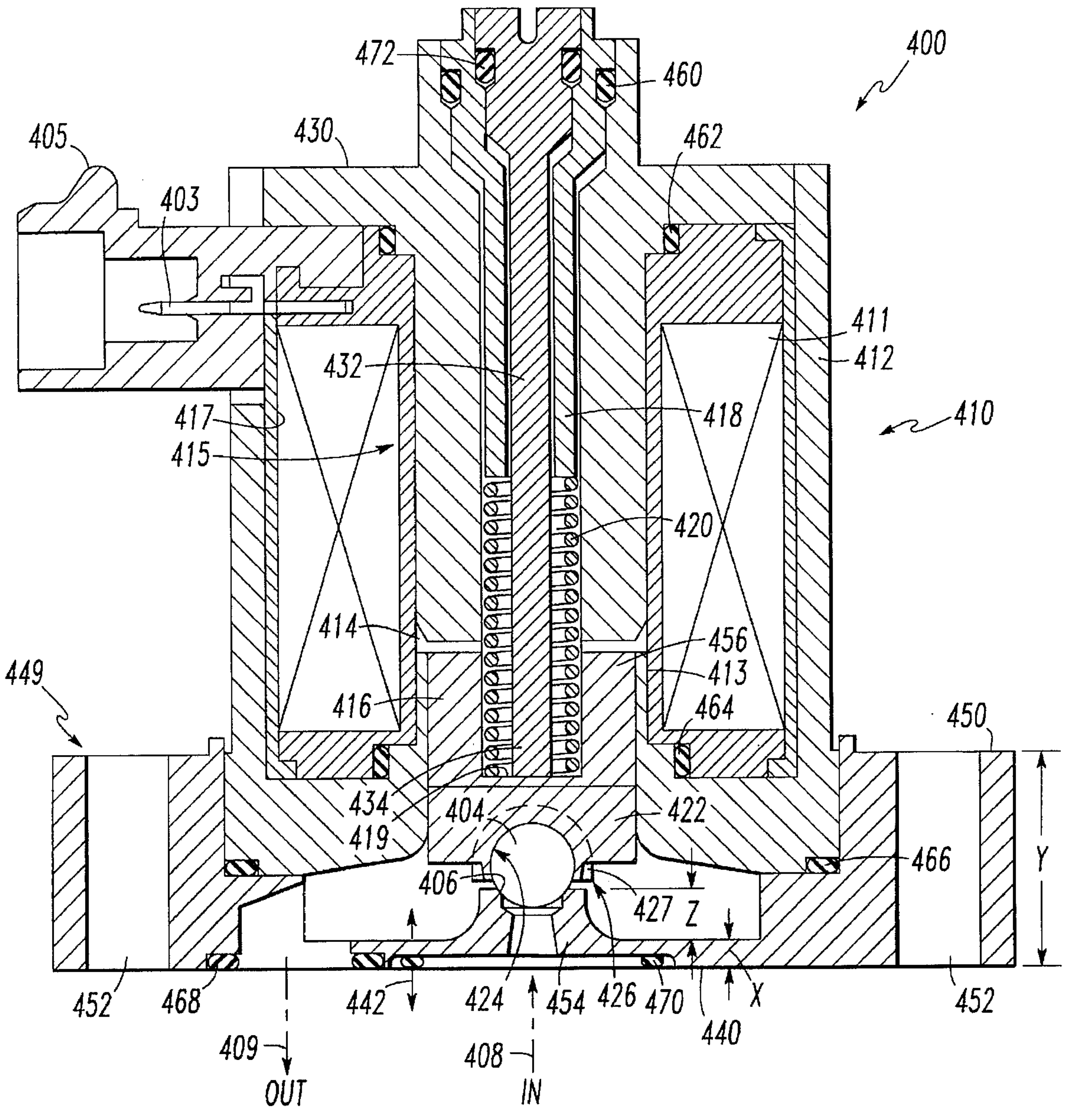
FIG. 4 is a cross-sectional view of the control valve in an unexcited (closed) state in accordance with a second embodiment of the present invention.
Figure 5:
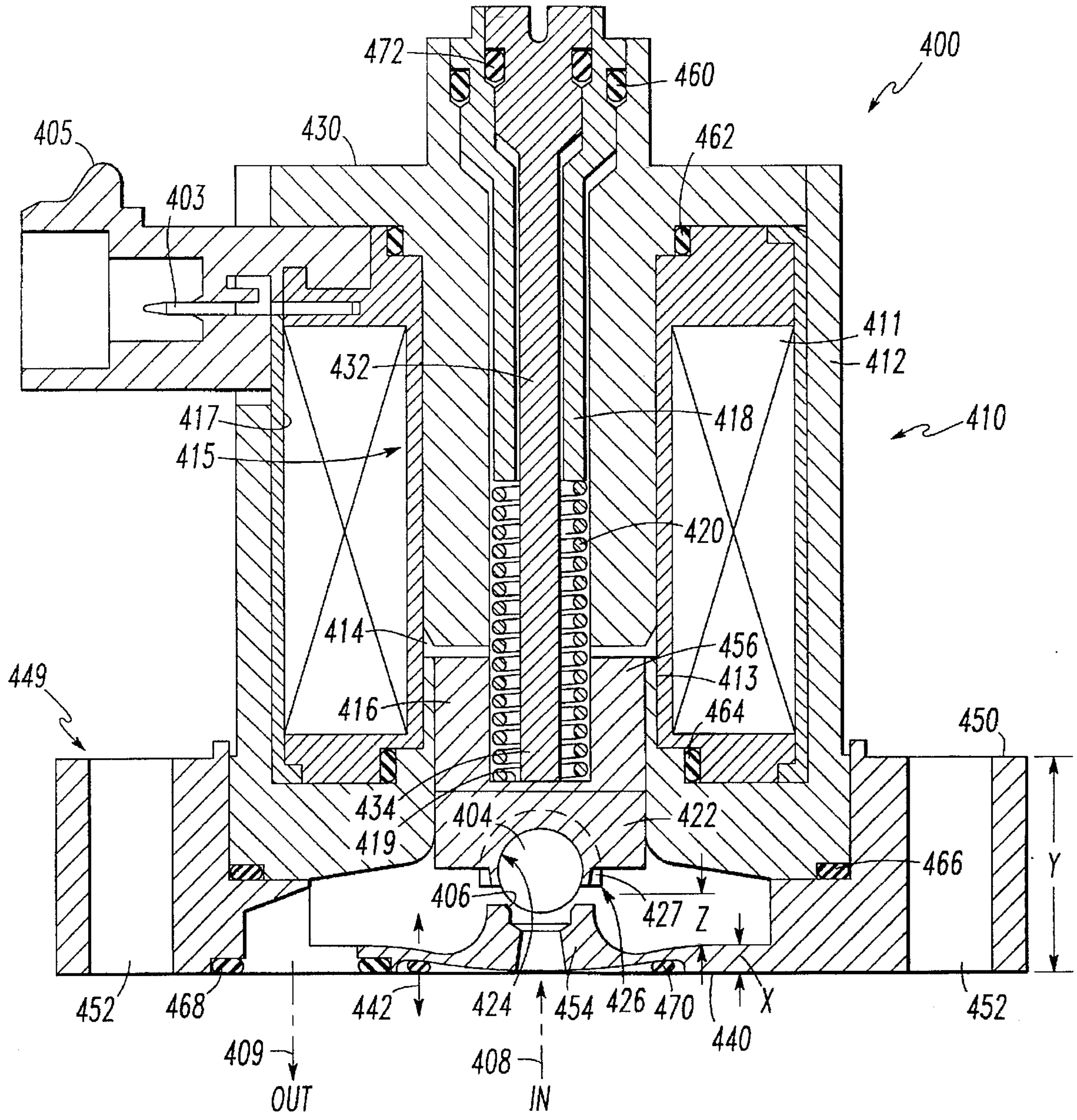
FIG. 5 is a cross-sectional view of the control valve in an excited (open) state in accordance with the second embodiment of the present invention.

FIGS. 4 and 5 illustrate a control valve 400 according to an alternative embodiment of the present invention. FIG. 4 illustrates the control valve 400 in its closed position while FIG. 5 shows the control valve 400 in its open position. This control valve 400 may be used in place of injection fuel control valves 124,128, and also may be used in the place of timing fluid control valves 122,128 with a minor change to the shape of the mounting flange 450, as explained below.

The control valve 400 of this embodiment is very similar to the control valve 124 of the first embodiment. The components of the present structure include an actuation means including a solenoid coil 411, an armature 416, and a valve element supporting member 422 (which may be integral with the armature 416) with its associated recessed area 427 that includes a recessed portion 424 and annular extension 426. Other similar components of the control valve 400, which are discussed in detail above, include the terminal pair 403, the coil assembly 405, control signal 402, valve seat 406, inlet 408, outlet 409, housing 410, solenoid coil 411, coil housing 412, bobbin 413, inner bore region 414, inner side of solenoid coil 415, armature 416, outer side of solenoid coil 417, middle portion 419 of armature 416, compression spring 420, upper pole piece 430, compliant web means 440, flexing motion of compliant web means 442, mounting means 449, mounting bores 452, outer portion 456 of armature 416, boss portion 454, and o-ring seals 460,462,464,466,468,470,472.

This embodiment, however, utilizes a different structure for limiting the movement of the armature 416 than the previous embodiment. Instead of using a donut-shaped, non-magnetic armature shim 232, a spring shim 234, and a spring guide/spacer 218 (see FIG. 1), the present embodiment utilizes a valve pin 432 positioned in the inner bore region 414 of the control valve 400 and extending from the top of the control valve 400, as depicted in FIG. 4, down almost to the middle portion 419 of the armature 416. In addition, an adjusting means 434 is positioned in the inner bore region 414 and disposed concentrically about a portion of the valve pin 432 located above the compression spring 420. The adjusting means 434 is used to adjust the force that the compression spring 420 places on the check ball 404 in a direction towards the valve seat 406. In this case, the adjusting means 434 is shown having a cylindrical hollow rod structure, but any other means that accomplishes the same purpose may be used, such as a second spring or an extension of the valve pin 432 that moves relative to the valve pin 432.

In this embodiment, even though a valve pin 432 is used, it is not the conventional valve stop pin used to limit the movement of a check ball directly. In this embodiment, the valve pin 432 limits the movement of the armature 416, and never comes into contact with the check ball 404. Therefore, the valve pin 432 does not have to be made of a hard material like that of the check ball 404, as is necessary in conventional structures that use the conventional valve stop pin.

In order to set the total travel of the armature 416/check ball 404, the upper pole piece 430 is positioned to set the approximate limit that the armature 416 can travel between the closed and open positions of the control valve 400. Then, the valve pin 432 is positioned to provide a precise limitation of movement of the armature 416/check ball 404. It should be noted that the valve pin 432 is positioned such that the armature 416 never actually comes into contact with the upper pole piece 430. It should be further noted that with respect to FIGS. 4 and 5 that the actual space between the armature 416 and the upper pole piece 430 is on the order of a few thousandths of an inch, but this space may be other sizes as well as desired for a particular application.

Figure 6:
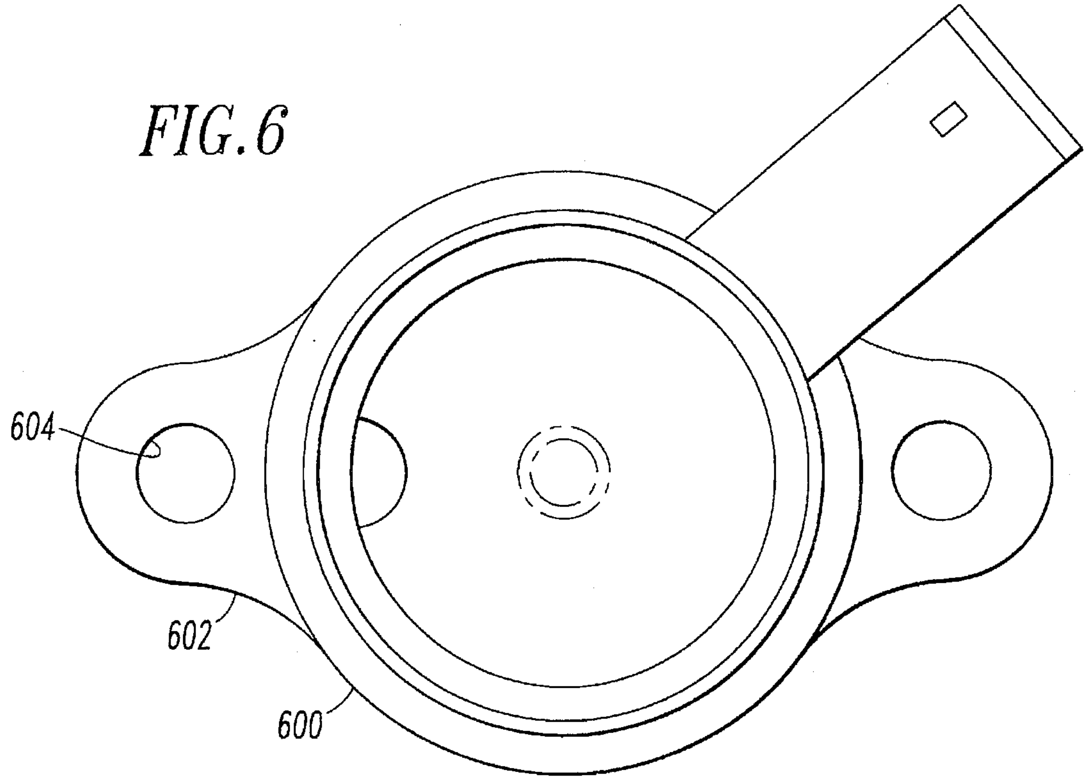
FIG. 6 is a top view of the control valve for a metering circuit in accordance with the present invention.
Figure 7:
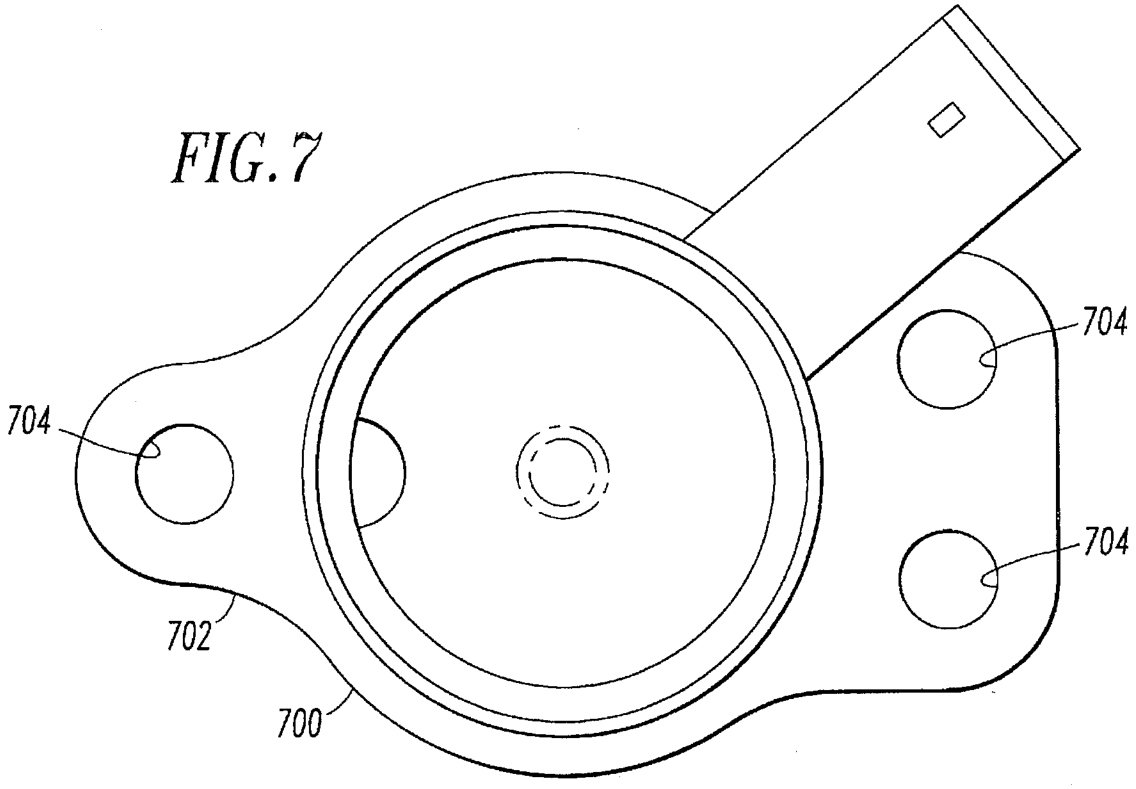
FIG. 7 is a top view of the control valve for a timing fluid circuit in accordance with the present invention.

Referring now to FIGS. 6 and 7, the top view of the control valves 122,124,126,128 will be described. FIG. 6 illustrates the top view of control valves 124,128 for the metering circuit in accordance with the present invention and FIG. 7 shows a top view of control valves 122,126 for the timing fluid circuit in accordance with the present invention. The timing fluid control valves 122,126 are structurally very similar to the injection fuel control valves 124,128. The main differences between the two types exist as to the flow requirements of each, which result in a different stroke for each type, the inlet orifice diameters, and the solenoid coils which differ in number of turns and wire size. One notable structural difference from FIGS. 6 and 7 is that the mounting means 600 for the injection fuel control valves 124,128 slightly differs from the mounting means 700 for the timing fluid control valves 122,126. While the mounting means 600 for the injection fuel control valve 124,128 has one mounting bore 604 disposed on opposite sides in the mounting flange 602, the mounting means 700 for the timing fluid control valves 122,126 has one mounting bore 704 disposed on one side of the mounting flange 702 and two mounting bores 704 disposed equidistant from a point opposite the first mounting bore 704. It should be apparent that additional mounting bores may be used and/or the bores may be placed in different areas of the mounting flange than shown in FIGS. 6 and 7 to achieve the same result.

INDUSTRIAL APPLICABILITY

The control valve of the present invention may be utilized in any system requiting the ability to control flow of fluid between a source and a load, and especially where very precise control of fluid flow is desired, such as with fuel injectors. In addition, the control valve of the present invention is particularly suited for use in a timing fluid and injection fuel metering system for an internal combustion engine.

We claim:

1. A control valve mounted to a compliant member of an internal combustion engine for selectively controlling fluid flow, comprising:

a housing having at least one fluid passage formed therein;

a valve seat surrounding said at least one passage formed in said housing;

a valve element for contacting with said valve seat for selectively stopping fluid flow through said at least one passage;

a biasing means for applying a closure force against said valve element in a direction towards said valve seat; and an actuation means for selectively causing movement of said valve element within an inner bore region formed in said housing, wherein said actuation means comprises:

an armature positioned in said inner bore region in said housing for controlling the movement of said valve element between a closed position of said valve element in contact with said valve seat and an open position spaced away from said valve seat, a valve element supporting member positioned in said inner bore region of said housing in between said armature and said valve element wherein said valve element supporting member has a recessed area abutting with a majority of a surface area of said valve element;

a limiting means positioned in said inner bore region for limiting the movement of said armature when said valve element moves from said closed position to said open position; and an armature shim means positioned between said armature and said limiting means for preventing contact between said armature and said limiting means.

2. The control valve of claim 1, wherein said valve element comprises:

a first semispherical surface portion; and a second surface portion opposite to said first semispherical surface portion, wherein said valve seat contacts said second surface portion opposite to said first semispherical surface portion when said valve element is in said closed position, and wherein said recessed area of said valve element supporting member abuts said first semispherical surface portion of said valve element.

3. The control valve of claim 2, wherein said first semispherical surface portion is greater than one half of the total surface area of said valve element.

4. The control valve of claim 1, wherein said valve element supporting member is formed integral with said armature.

5. The control valve of claim 1, wherein said valve element supporting member comprises an annular extension extending beyond a major diameter of said valve element, wherein said annular extension is crimped inward towards said valve element for securing said valve element against said valve element supporting member.

6. The control valve of claim 1, wherein said housing includes at least two passages wherein at least one of said passages is an inlet passage and another of said passages is an outlet passage, with said valve seat surrounding said inlet passage and said valve element contacting said valve seat surrounding said inlet passage.

7. The control valve of claim 1, further comprising a valve pin positioned in said inner bore region for limiting the movement of said armature when said valve element moves from said closed position to said open position.

8. The control valve of claim 7, further comprising a biasing adjusting means positioned in said inner bore region and adjacent said biasing means for adjusting said closure force against said valve element in said direction toward said valve seat.

9. The control valve of claim 1, wherein said actuation means is electromagnetically operated.

10. The control valve of claim 1, wherein said biasing means is a compression spring.

11. The control valve of claim 1, wherein said valve element is a sphere.

12. The control valve of claim 1, wherein said housing further comprises:

a mounting means for connecting said housing to said supporting member of said internal combustion engine; and a compliant web means for flexing when said valve element contacts with said valve seat when said valve element moves from said open position to said closed position.

13. The control valve of claim 12, wherein said compliant web means is formed integral with said mounting means.

14. The control valve of claim 12, wherein said valve seat is formed integral with said mounting means.

15. The control valve of claim 12, wherein said valve seat is formed integral with said compliant web means.

16. The control valve of claim 12, wherein said compliant web means has a first predetermined thickness less than a second predetermined thickness of said mounting means.

17. The control valve of claim 12, wherein said compliant web means comprises a raised boss portion wherein said valve seat is formed integral with said raised boss portion, and wherein said compliant web means has a first predetermined thickness less than a third predetermined thickness of said raised boss portion.

18. A control valve mounted to a supporting member of an internal combustion engine for selectively controlling fluid flow, comprising:

a housing having at least one fluid passage formed therein;

a valve seat surrounding said at least one passage formed in said housing;

a valve element for contacting said valve seat for selectively stopping fluid flow through said at least one passage;

a biasing means for applying a closure force against said valve element in a direction towards said valve seat;

a mounting means for connecting said housing to said supporting member of said internal combustion engine;

a compliant web means for flexing when said valve element contacts with said valve seat when said valve element moves from an open position to a closed position, said compliant web means having a first predetermined thickness adjacent said valve seat which is less than a predetermined thickness of said mounting means; and an actuation means for selectively causing movement of said valve element within an inner bore region formed in said housing, wherein said actuation means comprises:

an armature positioned in said inner bore region in said housing for controlling the movement of said valve element between said closed position of said valve element in contact with said valve seat and said open position spaced away from said valve seat, and a valve element supporting member positioned in said inner bore region of said housing in between said armature and said valve element wherein said valve element supporting member has a recessed area abutting with a surface of said valve element.

19. The control valve of claim 18, wherein said compliant web means is formed integral with said mounting means.

20. The control valve of claim 18, wherein said valve seat is formed integral with said mounting means.

21. The control valve of claim 18, wherein said valve seat is formed integral with said compliant web means.

22. The control valve of claim 18, wherein said compliant web means comprises a raised boss portion wherein said valve seat is formed integral with said raised boss portion, and wherein said first predetermined thickness is less than a third predetermined thickness of said raised boss portion.

23. The control valve of claim 18, wherein said valve element supporting member is formed integral with said armature.

24. The control valve of claim 18, wherein said valve element comprises a sphere having a major diameter.

25. The control valve of claim 24, wherein said valve element supporting member comprises an annular extension extending beyond said major diameter of said valve element, wherein said annular extension is crimped inward towards said valve element for securing said valve element against said valve element supporting member.

* * * * *